Feb. 26, 1952             G. WALTER             2,587,015
CLUTCH AND BRAKE FOR MARINE REVERSE GEARS
Filed Dec. 18, 1948                                   5 Sheets-Sheet 1
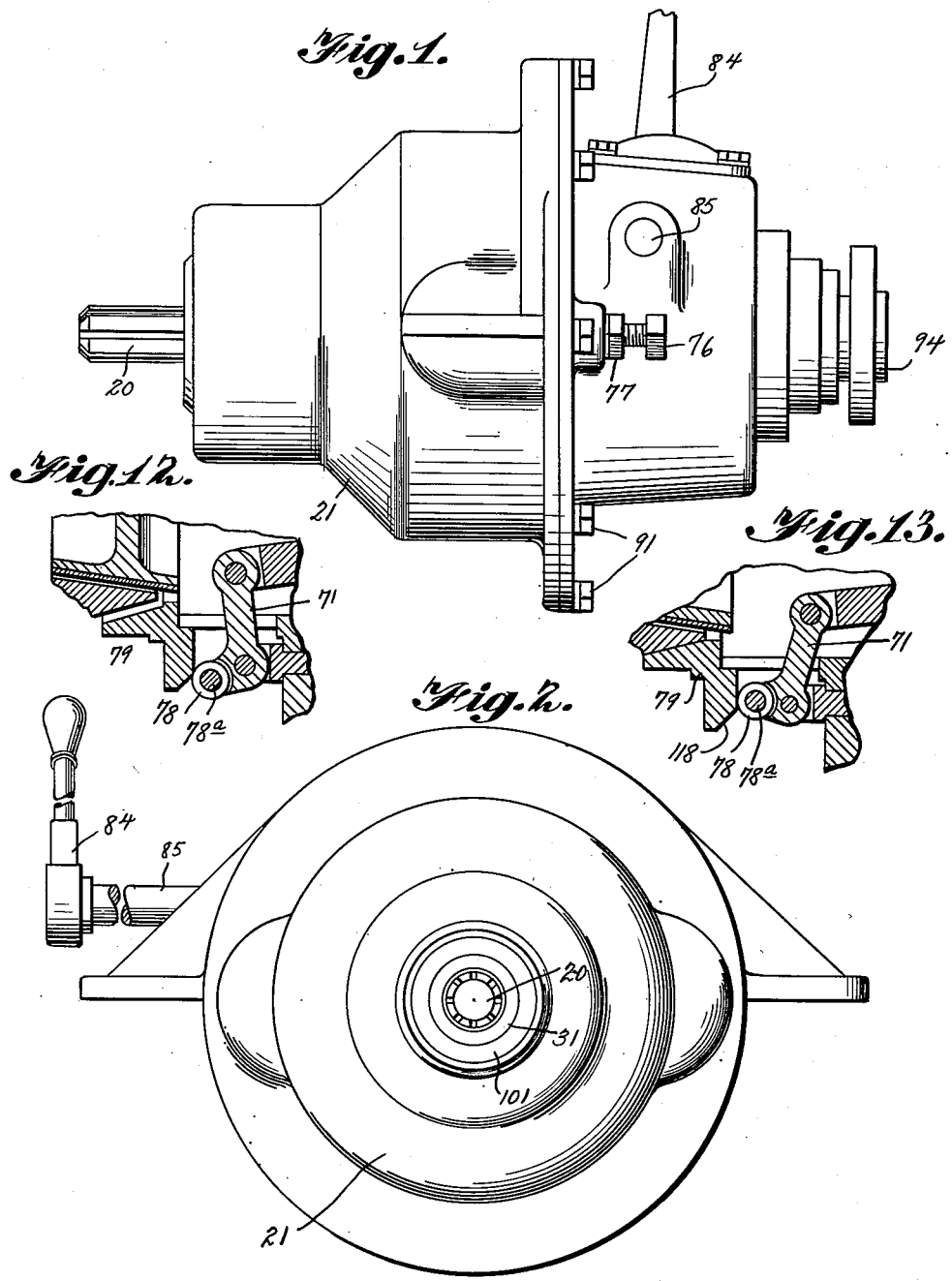
INVENTOR.
Gustave Walter
BY
Mawhinney & Mawhinney
Attorneys

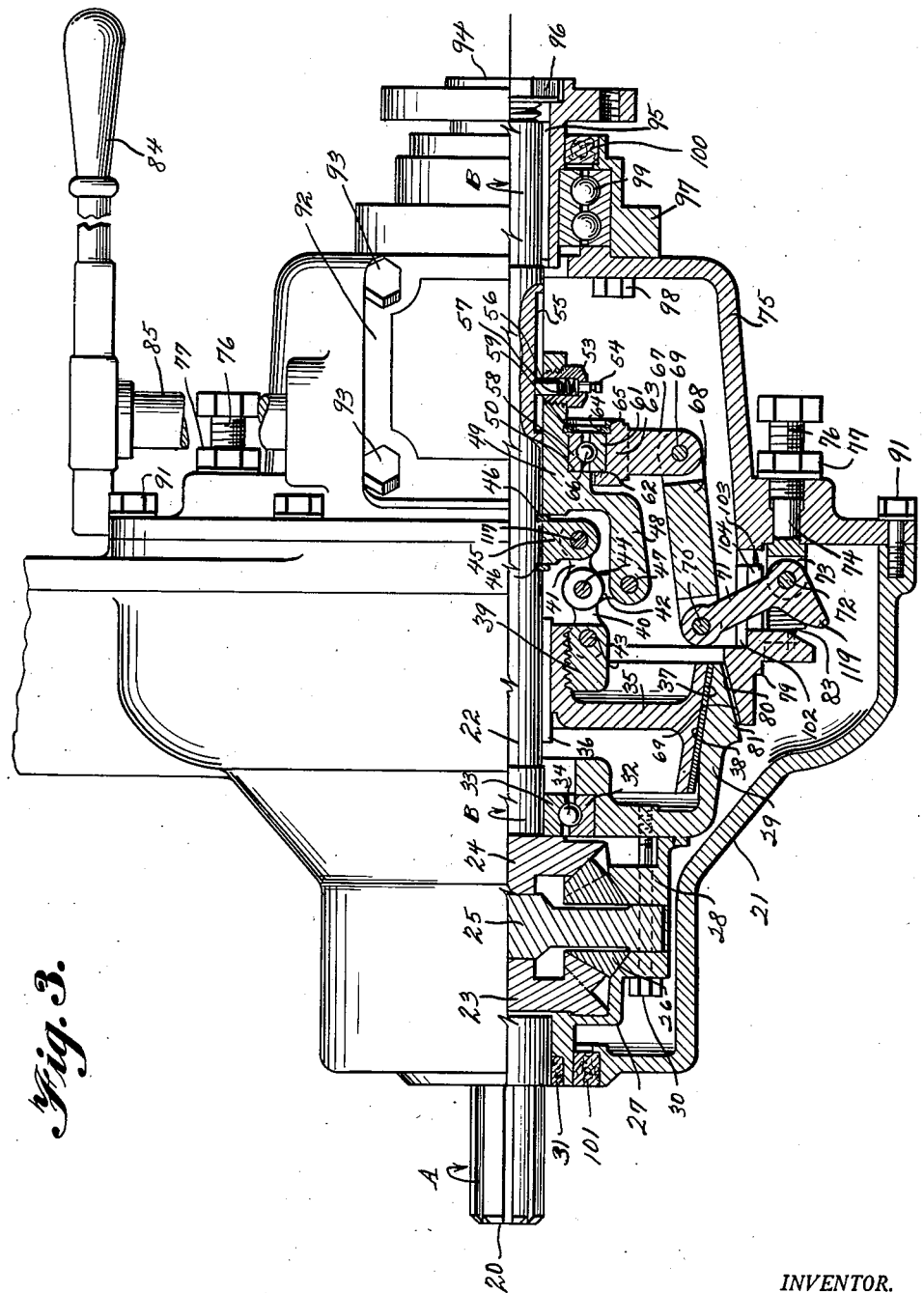

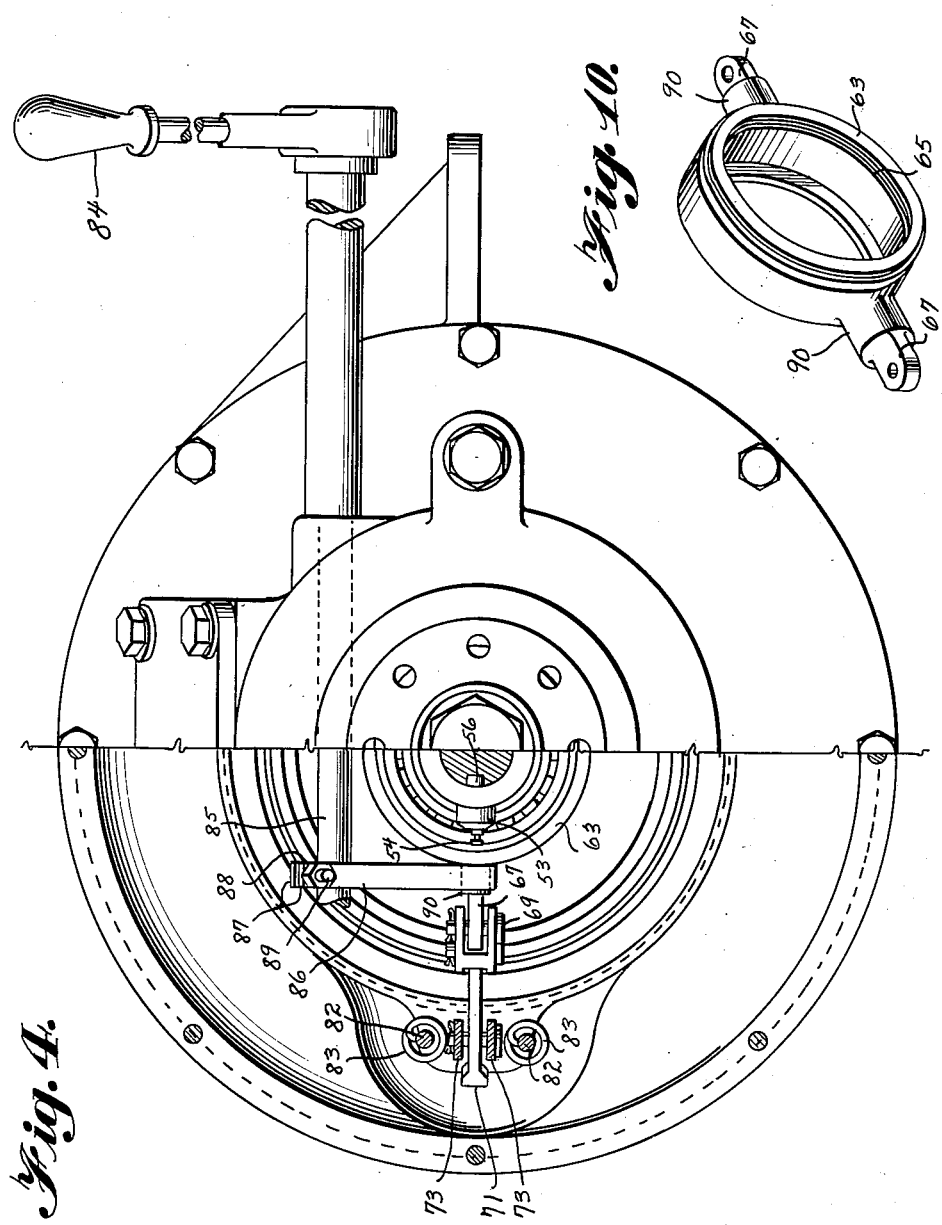

Feb. 26, 1952     G. WALTER     2,587,015
CLUTCH AND BRAKE FOR MARINE REVERSE GEARS
Filed Dec. 18, 1948     5 Sheets-Sheet 4
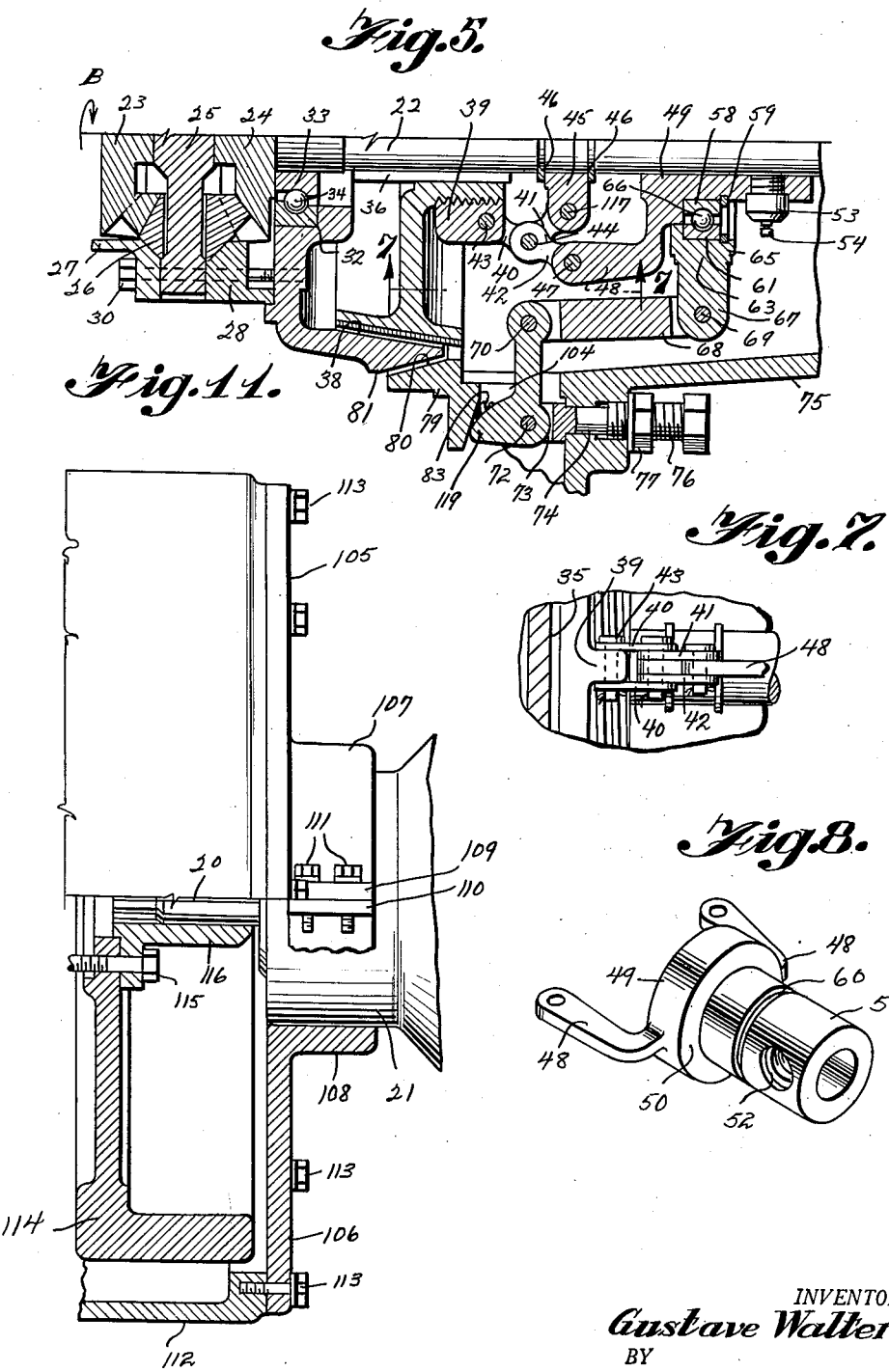
INVENTOR.
Gustave Walter
BY
Mawhinney & Mawhinney
Attorneys Feb. 26, 1952 G. WALTER 2,587,015
CLUTCH AND BRAKE FOR MARINE REVERSE GEARS
Filed Dec. 18, 1948 5 Sheets-Sheet 5

INVENTOR.
Gustave Walter
BY
Mawhinney & Mawhinney
Attorneys

Patented Feb. 26, 1952

2,587,015

UNITED STATES PATENT OFFICE 2,587,015

CLUTCH AND BRAKE FOR MARINE REVERSE GEARS

Gustave Walter, Jersey City, N. J.

Application December 18, 1948, Serial No. 66,076

12 Claims. (Cl. 192—17)

The present invention relates to improvements in clutch and brake for marine reverse gear and has for an object the provision of a gear of this kind for controlling an engine which operates in either right-hand or left-hand rotation. This gear includes a differential between the drive and follower shafts so as to selectively establish a neutral position in which the two shafts are disconnected, to connect the shafts for forward rotation of the follower shaft and to stop the forward rotation of the follower shaft and reverse its direction of rotation.

Another object of the present invention is to provide an improved structure in which only soft hand action on the lever is necessary but strong action on the clutch for disengaging the same is obtained.

Still another object of the present invention is to provide an improved reverse gear which eliminates the hit or miss action resulting when springs are depended upon for disengaging the clutch. This improvtment is particularly desirable when the reverse gear is used for controlling the rotation of a propeller on a boat since the boat must be positively stopped immediately to avoid collisions with other boats or the docks and in making changes in the boat's course.

A further object of the present invention is to provide a device of this character in which the brake ring is supported and guided in its sliding movements into and out of operative position independently of the clutch housing and is positively held against rotation.

A still further object of the present invention is to provide an improved reverse gear which can be readily applied to engines and other machinery in service as well as to new engines and machinery without modifying their structure.

With the foregoing and other objects in view, the invention will be hereinafter more fully described and more particularly pointed out in the appended claims.

In the drawings, in which the same parts are denoted by the same reference numerals throughout the several views, Figure 1 is a side elevational view of the improved reverse gear constructed in accordance with the present invention.

Figure 2 is a front elevational view of the improved device.

Figure 3 is a top plan view of the improved device in the forward position with parts broken away and parts in section.

Figure 4 is a rear elevational view with parts broken away and parts in section.

Figure 5 is a fragmentary horizontal sectional view with the parts in neutral position.

Figure 7 is a fragmentary longitudinal sectional view on the line 7—7 of Figure 5.

Figure 8 is a perspective view of the forward shifter.

Figure 10 is a perspective view of the shifter yoke.

Figure 11 is a fragmentary side elevational view of the adapter and associated parts with parts in section.

Figure 12 is a fragmentary detail view showing the position of the roller and pin of the shifter finger when the brake ring is in its inoperative position, and Figure 13 is a view similar to Figure 12 but showing the position of the roller and pin when the brake ring is in its operative position.

Figure 6:
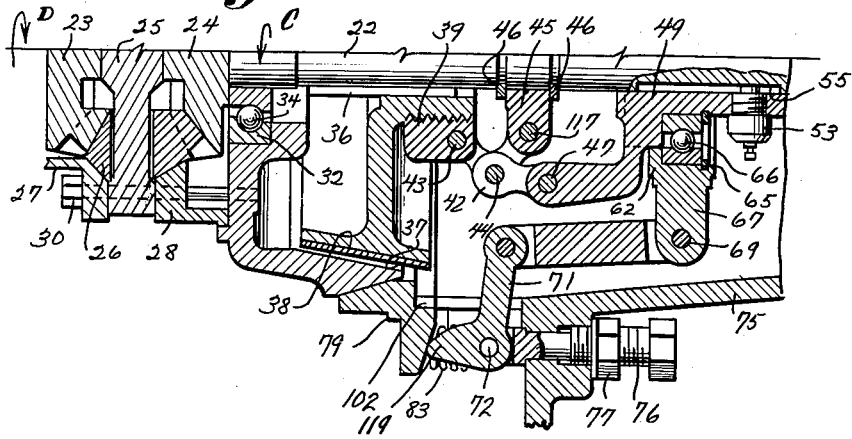
Figure 6 is a view similar to Figure 5 but with the parts in reverse position.
Figure 9:
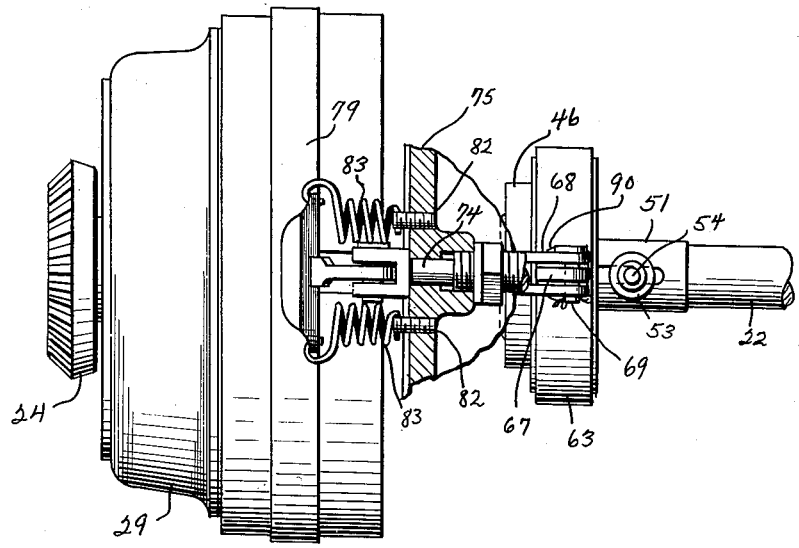
Figure 9 is a fragmentary side elevational view of the reverse shifter finger movement with parts in section.

Referring more particularly to the drawings, 20 indicates a drive shaft, one end of which is adapted to be operatively connected to an engine crank shaft or to the power shaft of some other machinery so that the shaft 20 is rotated thereby. The other end of the shaft 20 extends into a housing 21 and is connected to a follower shaft 22 by a differential which includes a bevel gear 23 fast on the shaft 20, a bevel gear 24 fast on the shaft 22 and a revolvable spider 25 disposed between the two bevel gears 23 and 24 and having bevel pinions 26 rotatably mounted thereon and meshing with both gears 23 and 24. The spider 25 is held in proper position by casings 27 and 28 which are bolted together and are secured to a clutch housing 29 by bolts 30 extending through the casings 27 and 28 and the spider 25 and into the housing 29.

The casing 27 encircles bevel gear 23 and that portion of the shaft 20 which extends into the housing 21 and an oil seal 31 is provided between the shaft 20 and the casing 27. The outer race 32 of a bearing is connected to the clutch housing 29, the inner race 33 of the bearing is fixed to the shaft 22 and the usual ball bearings 34 are mounted in the races 32 and 33 so that the clutch housing 29 can freely rotate independently of the shaft 22. A clutch cone 35 is keyed as at 36 to the shaft 22 and has an inclined clutch surface 37 which is adapted at times to engage a correspondingly shaped surface 38 on the clutch housing 29. An adjusting nut 39 is threadedly received by the clutch cone 35.

A pair of toggles spaced apart approximately 180 degrees are connected to the adjusting nut 39 and each comprises three links 40, 41 and 42. The forward end of each link 40 is pivotally connected as at 43 to the nut 39 and the rear end of each link 40 and the forward end of each link 41 are pivotally connected as at 44 to one end of the link 42. The rear end of each link 41 is pivotally connected to a supporting member which may be in the form of a clutch spider 45 which encircles the shaft 22 and is retained against longitudinal movement thereon by retaining rings 46 mounted in suitable circular grooves in the shaft 22. The opposite ends of the links 42 are pivotally connected as at 47 to the forward ends of arms 48 of a forward shifter which includes a ring portion 49 supporting the arms 48, an annular shoulder 50 and an elongated hub 51. The forward shifter encircles the shaft 22 and is adapted to have sliding movement thereon.

Adjacent its rear end the hub 51 has a threaded opening 52 therein for the reception of a pin holder 53 which supports an adjusting pin 54. The shaft 22 has six elongated keyways 55 angularly spaced around the outer surface of the shaft for selectively receiving the enlarged end 56 of the adjusting pin 54. A coil spring 57 is disposed within the pin holder 53 and encircles the intermediate portion of the adjusting pin 54. One end of the spring 57 bears against the pin holder 53 and its opposite end bears against the enlarged end 56 of the pin 54 for urging the end 56 into one of the keyways 55.

An inner race 58 of a bearing is confined between the shoulder 50 of the forward shifter and a retaining ring 59 which is received by an annular groove 60 in the hub 51 of the shifter. An outer race 61 is confined between a shoulder 62 on a shifter yoke 63 and a retaining ring 64 which is received by an annular groove 65 in the yoke 63. Ball bearings 66 are mounted in the races 58 and 61. The shifter yoke 63 has a pair of oppositely extending apertured ears 67 to each of which is pivotally connected one end of a shifter yoke link 68 by a shifter yoke pin 69. The opposite end of each link 68 is pivotally connected by a pin 70 to one end of a shifter finger 71, the other end of each of which is pivotally connected by a pin 72 between the legs 73 of a bifurcated shifter finger hinge 74. Each hinge pin 74 extends rearwardly into a suitable opening in a shifter housing 75. The rear portion of these openings are threaded to receive threaded bolts 76 which are adjustable and rotatable and which act as adjustable stops or abutments against which the hinge pins 74 abut.

Adjustable lock nuts 77 are mounted on the bolts 76 so that the cam portion 119 of each shifter finger 71 can be adjusted towards or from a brake ring 79 which surrounds the rear portion of the clutch housing 29 and has a beveled face 80 adapted at times to frictionally engage a correspondingly shaped face 81 of the housing 29. At each side of each hinge 74 the housing 75 has mounted therein screw threaded pins 82. Each pin 82 has an opening therein for receiving one end of a coil spring 83 and the opposite end of each coil spring is connected to the brake ring 79.

An operating handle 84 is connected to a shifter shaft 85 which in turn is connected to a pair of shifter forks 86. The upper end of each shifter fork 86 is split to form opposed jaws 87 and 88 which are urged into frictional clamping engagement with the shaft 85 by a bolt 89. The lower end of each shifter fork 86 is bifurcated and the bifurcated end straddles a cylindrical boss 90 on the extended apertured ears 67 of the shifter yoke 63. The housings 21 and 75 are connected by bolts 91 and a shifter housing cover 92 is mounted on the housing 75 by bolts 93. The shaft 22 is adapted to be connected to a boat propeller or the like by a clutch flange 94 which is keyed to the shaft 22 by a clutch flange key 95. The clutch flange is maintained on the shaft 22 by a clutch flange lock nut and washer 96. A bearing cover 97 is mounted on the housing 75 by cap screws 98. The bearing cover supports a ball bearing 99 and an oil seal 100. An oil seal 101 is disposed between the forward end of the housing 21 and the casing 27.

The shifter housing 75 has a forwardly extending annular bearing portion or section 102 and the brake ring 79 has a rearwardly extending annular flange 103 which slidably engages the outer surface of the bearing portion 102 of the housing 75. The bearing portion 102 and the annular flange 103 are provided with aligned slots 104 through which the forward fingers 71 extend.

The reversing gear described above is adapted to be connected to the crank shaft of an engine and for this purpose a pair of semicircular adapter plates 105 and 106 are provided. The adapter plates 105 and 106 have semicircular rearwardly extending flanges 107 and 108 respectively, which have pairs of abutting lugs 109 and 110 for the reception of clamping screws 111, whereby the adapter plates are frictionally secured to the forward end of the reverse housing 12. The adapter plates 105 and 106 are connected to a flywheel housing 112 by bolts 113. A flywheel 114 is disposed within the flywheel housing 112 and has secured thereto by bolts 115 adjacent its central portion a pinion shaft flange 116 which is splined to the drive shaft 20.

In the operation of the device, assuming that it is desired to propel the boat or other machine to which the reverse gear is connected in a forward direction, the handle 84 is moved so that the arms 48 of the forward shifter are moved forwardly by means of the shaft 85, forks 86, shifter yoke 63 and bearing 66. This movement of the arms 48 will cause the clutch surface 37 of the clutch cone 35 to frictionally engage the surface 38 of the clutch housing 29 through the links 40, 41 and 42. At this time the brake ring 79 is out of engagement with the beveled surface 81 of the clutch housing 29. In this instance, the bevel gear 24 on the shaft 22 due to the weight of the shaft 22 and the resistance offered by the water to the rotation of the immersed propeller, is held against rotation. The drive shaft 20 is rotated by the engine to which it is connected and the bevel gear 23 on the shaft 20 is also rotated in the direction indicated by arrow A shown in Figure 3.

Since the bevel pinions 26 on the spider 25 are at all times in mesh with both bevel gears 23 and 24 and since the bevel gear 24 is locked against rotation as above explained the bevel pinions 26 are prevented from rotating on their own axes. Accordingly the bevel pinions 26 will revolve bodily with the spider 25 by walking around on the bevel gear 24. As the spider 25 rotates it carries with it the casings 27 and 28 and the clutch housing 29. Inasmuch as the clutch cone 35 is in frictional engagement with the rotating clutch housing 29 this rotation of the housing 29 will be imparted to the clutch cone 35, which in turn will cause the shaft 22 through the key 36 to rotate at the same rate of speed and in the same direction as the drive shaft 20, as indicated by arrows B in Figure 3. The clutch flange 94 which is keyed to the shaft 22 will likewise be rotated and the propeller of the boat will be driven so as to impart a forward movement to the boat.

When the surfaces 37 and 38 of the clutch cone 35 and the clutch housing 29, respectively, are in engagement as shown in Figure 3, the toggle joints comprising links 40, 41 and 42 are past dead center. In this position the toggle joints will effectively resist centrifugal action and maintain the clutch surface 37 in firm frictional engagement with the clutch surface 38 of the clutch housing 29. It will be noted from Figure 3 that the connections 43, 44 and 117 between the links of the toggle 40, 41 and 42, respectively, are in a line which extends at an angle of the order of twenty degrees to the longitudinal axis of the shaft 22. This arrangement enhances the resistance of the toggle joints to be broken under the force of centrifugal action.

In order to obtain the neutral position illustrated in Figure 5, the handle 84 is moved in a direction opposite to that in which it is moved to secure forward drive. The actuation of the handle 84 in this new direction will cause the arms 48 of the forward shifter to be moved rearwardly and a downward and rearward pull will be exerted on the links 42 so that the toggle joints will be broken and the clutch surface 37 of the cone 35 will be moved out of engagement with the clutch surface 38 of the clutch housing 29 and the beveled face 80 of the brake ring 79 will remain out of contact with the beveled face 81 of the clutch housing 29. In this position of the parts the spider bevel pinions 26 will not rotate the bevel gear 24 on the shaft 22 as the weight of the shaft 22 and the resistance of the immersed propeller to rotation will prevent rotation of the shaft 22 and its gear 24. Accordingly the bevel pinions 26 will walk around on the gear 24 thereby rotating the spider 25, the casing 28 and the clutch housing 29 which will freely rotate without imparting its rotating movement to the clutch cone 35. In this position of the parts, therefore, no driving force is imparted to the shaft 22 and the gear is in neutral position.

Further movement of the handle 84 in the second direction will cause the shifter yoke 63 to move further toward the rear. This movement through the links 68, will cause the cam portions 119 of the shifter fingers 71 to move the beveled face 80 of the brake ring 79 into frictional engagement with the beveled face 81 of the clutch housing 29. This engagement of the brake ring 79 with the housing 29 will prevent the rotation of the housing 29 which in turn will prevent rotation of the spider 25. The bevel pinions 26 on the spider must rotate on their own axes due to their meshing with the bevel gear 23. The bevel pinions 26 rotating on their own axes on the spider 25 will rotate the bevel gear 24 and the shaft 22 in a direction opposite to that in which the shaft 20 is rotating, as indicated by the arrows C and D, respectively, in Figure 6. In this position of the parts the propeller will be driven in reverse.

A sliding movement of the handle 84 in the opposite direction will cause disengagement of the beveled face 80 of the brake ring 79 from the beveled face 81 of the clutch housing 29 to place the parts in their neutral position again as shown in Figure 5. When the cam portions 119 of the shifter fingers 71 are moved out of engagement with the brake ring 79, the coil springs 83 will slide the brake ring out of engagement with the clutch housing 29.

In its movement into and out of braking position the brake ring 79 is supported independently of the clutch housing 29 by the annular bearing portion 102 of the shifter housing 75. In other words, the brake ring 79 is centrally positioned and supported on the bearing portion 102 of the housing 75. The brake ring 79 cannot rotate due to the shifter fingers 71 extending through the aligned slots 104 in the bearing portion 102 and the annular flange 103 of the housing 75 and the brake ring 79, respectively.

In order to adjust the engagement between the beveled face 80 of the brake ring 79 and the beveled face 81 of the clutch housing 29, the handle 84 is moved to its extreme forward position to engage the cam portions 119 of the shifter fingers 71 with the brake ring 79 to effect contact of the beveled faces 80 and 81 of the brake ring 79 and clutch housing 29, respectively. The lock nuts 77 are then loosened and the bolts 76 are screwed further into the housing 75 to move the shifter finger hinges 74 and the shifter fingers 71 forwardly to tighten the engagement of the beveled faces 80 and 81 of the brake ring 79 and the clutch housing 29, respectively. When the desired adjustment has been obtained the locking nuts 77 are again tightened.

In order to adjust the clutch cone 35 with respect to the surface 38 of the clutch housing 29, the enlarged end 56 of the adjusting pin 54 is withdrawn from the keyway 55 against the action of the coil spring 57. The adjusting nut 39 is then rotated in the desired direction to move the clutch surface 37 of the clutch cone 35 towards or from the clutch surface 38 of the housing 29. It is possible to rotate the adjusting nut 39 since the clutch spider 45 and the forward shifter are free to rotate as long as the enlarged end 56 of the adjusting pin 54 is out of the keyways 55. After the desired adjustment of the clutch cone 35 has been obtained the enlarged end 56 of the adjusting pin 54 is permitted to enter one of the keyways 55 under the influence of the coil spring 57. Six keyways 55 are provided so that the end 56 of the adjusting pin 54 can be easily located in a keyway after the angular adjustment of the nut 39 has been made.

As shown in Figures 12 and 13, each of the shifter fingers 71 may have a roller 78 mounted thereon by a pin 78ᵃ in lieu of the cam portion 119. In Figure 13, the center of the roller 78 is past the bevel section 118 of the brake ring so that the shifter finger 71 is locked to the brake ring.

It is obvious that various changes and modifications may be made in the details of construction and design of the above specifically described embodiment of this invention without departing from the spirit thereof, such changes and modifications being restricted only by the scope of the following claims.

What I claim is:

1. In a device of the class described, a rotatable driving clutch housing, a follower shaft, means for breaking said housing, a shiftable clutch member slidably keyed to said follower shaft, means to cause engagement and disengagement of said shiftable clutch member and said braking means with said housing, and a shifter housing supported by said follower shaft and having an annular bearing portion, said braking means having an annular flange slidably engaging the bearing portion of the shifter housing to support the braking means during its movement into and out of engagement with said housing.

2. In a device of the class described, a rotatable driving clutch housing, a follower shaft, means for clutching said housing to said shaft comprising a shiftable clutch member slidably keyed to said shaft, means for braking said housing comprising a face on and rotatable with said housing and a brake member movable into and out of engagement with said face, and means to cause engagement and disengagement of said shiftable clutch and brake members with said housing comprising an adjusting nut carried by said shiftable clutch member, a clutch spider mounted on said follower shaft and held against axial movement thereon, a pair of links connecting said adjusting nut and clutch spider, a third link connected to said pair of links, and a forward shifter slidably mounted on said follower shaft and connected to said third link.

3. A device as claimed in claim 2 characterized by the fact that the means to cause engagement and disengagement of said shiftable clutch and brake members with said housing further comprises an adjusting pin carried by said forward shifter and that said follower shaft is provided with a series of angularly spaced apart keyways for the selective reception of said adjusting pin.

4. A device as claimed in claim 3 characterized by the fact that the means to cause engagement and disengagement of said shiftable clutch and brake members with said housing further comprises a shifter shaft, a pair of shifter forks mounted on said shifter shaft, a shifter yoke operatively connected to said shifter forks and to said forward shifter, cams operatively connected to said shifter yoke for urging said brake member into engagement with said first clutch member.

5. A device as claimed in claim 4 characterized by the fact that the means to cause engagement and disengagement of said shiftable clutch and brake members with said housing further comprises a shifter housing, a pair of shifter finger hinges mounted on the shifter housing, that said cams are pivotally mounted on shifter finger hinges, and that adjusting bolts are carried by the shifter housing in contact with the shifter finger hinges so that the cams can be adjusted towards and from the brake member.

6. A device as claimed in claim 5 characterized by the fact that the means to cause engagement and disengagement of said shiftable clutch and brake members with said housing further comprises springs connected to the shifter finger hinges and the brake member for disengaging the brake member from the first clutch member.

7. A device as claimed in claim 6 characterized by the fact that a handle is fixed to said shifter shaft for selectively rotating the shaft in opposite directions.

8. A device as claimed in claim 1 characterized by the fact that said braking means includes shifter fingers and that said bearing portion and annular flange are provided with aligned slots through which the shifter fingers extend to prevent rotation of the brake member.

9. In combination, a drive clutch member, a rotatably driven clutch member slidable into and out of engagement with said drive clutch member, a brake member slidable into and out of engagement with said drive clutch member, a supporting member rotatably mounted adjacent said slidable clutch member but fixed against sliding movement, toggle links connected between said supporting member and slidable clutch member, a shifter member rotatable with said supporting member and slidable clutch member and slidably mounted adjacent said supporting member, a connection between said shifter member and the toggle center, means biasing said brake member to a position away from said drive clutch member, and means moved by the sliding motion of said shifter member to urge said brake member into braking engagement with said drive clutch member.

10. The combination of claim 9 further comprising a follower shaft to which said driven clutch member and said shifter member are keyed.

11. The combination of claim 9 further comprises a follower shaft to which said driven clutch member and said shifter member are keyed, an adjusting nut axially adjustable on said driven clutch member and pivotally receiving the toggle connection, a removable key on said shifter member, said shaft having a number of angularly displaced key ways to selectively receive said key in accordance with the rotatable adjustment of said nut.

12. The combination of claim 9 in which said last-named means comprises a shifter ring carried to move longitudinally with said shifter member but held against rotation with said shifter member, shifter fingers pivotally mounted adjacent said brake member and having cam faces for engaging said brake member, and links connecting said shifter ring with said fingers.

GUSTAVE WALTER.

REFERENCES CITED

The following references are of record in the file of this patent:

UNITED STATES PATENTS

| Number | Name | Date |
|---|---|---|
| 171,063 | Swingle | Dec. 14, 1875 |
| 781,069 | Hewitt | Jan. 31, 1905 |
| 835,373 | Stacks | Nov. 6, 1906 |
| 1,001,615 | Budde | Aug. 29, 1911 |
| 1,857,365 | Dodge | May 10, 1932 |
| 2,055,887 | Yager | Sept. 29, 1936 |
| 2,072,174 | Marshall | Mar. 2, 1937 |
| 2,104,658 | Langdon | Jan. 4, 1938 |
| 2,226,661 | Grunstra | Dec. 31, 1940 |